Nov. 28, 1967    J. L. GRATZMULLER    3,354,872
FUEL SUPPLY SYSTEM FOR AN INTERNAL COMBUSTION ENGINE
Filed July 16, 1965
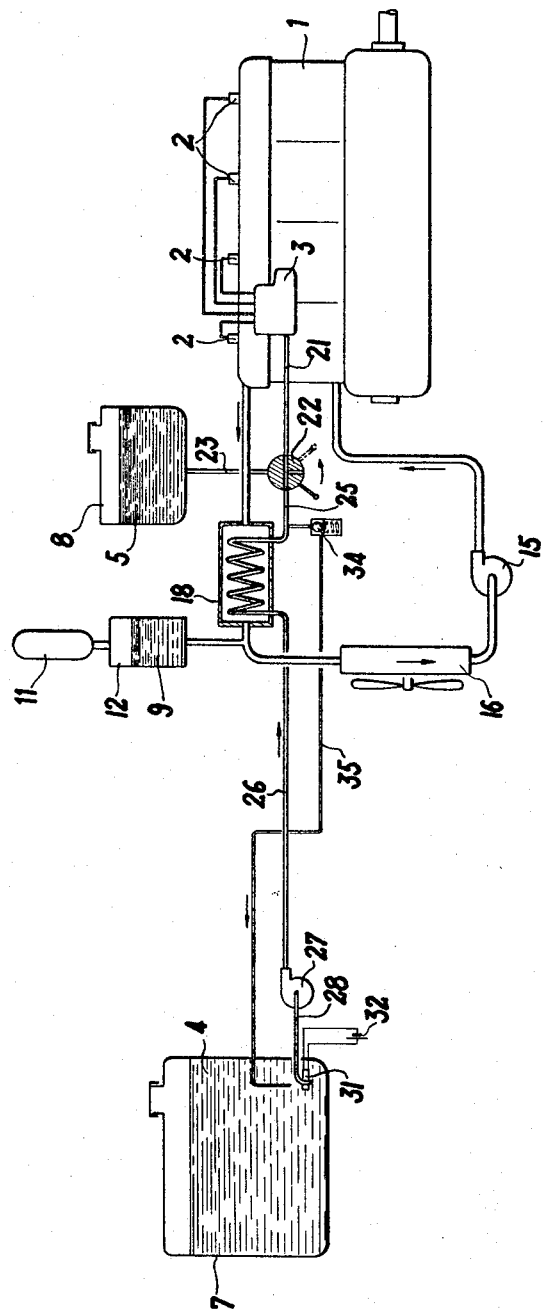

3,354,872
FUEL SUPPLY SYSTEM FOR AN INTERNAL COMBUSTION ENGINE
Jean Louis Gratzmuller, 66 Blvd. Maurice Barres, Neuilly-sur-Seine, France
Filed July 16, 1965, Ser. No. 472,441
Claims priority, application France, July 23, 1964, 982,732
4 Claims. (Cl. 123—30)

ABSTRACT OF THE DISCLOSURE

A system for feeding pre-heated fuel to a fuel injection pump of an internal combustion engine of the type having a cooling water jacket. The system includes a fuel delivery pump connected to a fuel reservoir for drawing fuel therefrom and for delivering such fuel through a heat exchanger to the fuel injection pump. The improvement in the system resides in the provision of a fluid pressure means connected to the fluid circuit to exert on the water supply, a substantially constant pressure of sufficient magnitude to prevent the formation of steam within the circuit.

---

The present invention relates to improvements in diesel engines and in particular to diesel engines in which the cooling system is normally maintained under pressure so as to raise the temperature of the coolant above its boiling point at atmospheric pressure. In such a cooling system, the coolant is maintained under a practically constant pressure by suitable means, so that the normal temperature during running of the engine may be above 100° C., say of the order of 120° C.

Internal combustion engines equipped with cooling system of this kind have already been described in my prior Patents Nos. 3,162,182; 3,162,183, and patent application No. 396,456 of Aug. 19, 1964.

The principal advantages of maintaining such a cooling system under pressure are as follows: improved efficiency of the radiators or equivalent heat exchangers, the elimination of vapour locks in the system, the reduction of dynamic corrosion, and an increased thermal level of the engine cycle.

It is known to be more advantageous, from the point of view of economy, to run diesel engines on heavy fuels, which will henceforth be referred to as "heavy oil," rather than on the relatively lighter fuels, commonly called "diesel oils." This economic advantage is particularly evident in diesel engines of large power, such as used in railway locomotives, ships, and electric power stations.

However, these heavier fuels, although more economical, are difficult to burn in diesel engines, since they are highly viscous at ordinary temperatures and do not flow freely enough to pass through the fuel injectors unless preheated to about 100° C., which implies the application of external heat, for instance, steam.

The object of the present invention is to provide for the ready use of heavy oils as fuels in diesel engines.

According to the present invention, a diesel engine comprises a feed tank for said fuel, connections from said tank to fuel injection valves in said engine, an auxiliary fuel-feeding means for supplying to said engine a lighter diesel oil during starting and preceding stopping of said engine, an auxiliary heating means for the heavy fuel at the point where said fuel is drawn from said feed tank, a cooling system containing coolant for said engine, pressure-applying means for maintaining said coolant at a temperature above its boiling point at atmospheric pressure and at least one heat exchanger interposed in one of said connections from said feed tank to said fuel injection valves, heavy fuel oil being intended to flow through said heat exchanger in contact with the hot liquid from said engine cooling system.

One embodiment of the invention will be described by way of example only with reference to the accompanying drawing which illustrates the general lay-out of the engine.

The diesel engine 1 is provided with injection valves 2 supplied by an injection pump 3, either with heavy fuel oil 4, during normal running, or with diesel oil 5, during starting-up and before stopping. "Heavy fuel oil" is to be understood as meaning an oil of a viscosity at ordinary temperature too high to permit this fuel to pass from the feed tank to the engine injectors, and "diesel oil" is an oil which has, in contrast, a sufficiently low viscosity to enable it to circulate as necessary. The heavy fuel oil is contained in a main feed tank 7 and the diesel oil in an auxiliary feed tank 8.

The engine cooling system is sealed from the outside and is so arranged that the coolant 9 contained therein can be held at a temperature above its boiling point at ordinary atmospheric pressure by pressure-applying and maintaining means consisting in the actual example of a compressed-air vessel 11 connected with the upper part of an expansion tank 12 which is itself connected at the bottom to a high point in the engine cooling circuit.

The coolant circuit (in the following it will be assumed that the coolant is water) comprises the cylinder cooling jackets, a pump 15 for circulating the coolant, a first heat exchanger 16 for reducing the cooling-water temperature, e.g., a water/air exchanger (such as a radiator with a fan), or a cooling water-sea water exchanger in the case of a marine engine, and at least a second heat exchanger 18 in which the temperature of the engine fuel is raised in one or more sections of the fuel feed line 28, 26, 21 between the tank 7 and the injection pump; i.e., more generally, upstream of the injection pump 3. This second heat exchanger for cooling water/fuel is interposed in the cooling-water circuit preferably between the discharge from the engine cooling water jackets and the intake to the first heat exchanger.

The fuel feed system of the engine comprises upstream of the injection pump 3, a pipe 21, and a three-way cock 22 which has a discharge connected with the pipe 21 and two intakes connected respectively, with the diesel-oil feed tank 8 by a pipe 23, and with the heavy oil feed tank 7 by means of the pipe 25, the second heat exchanger 18, a pipe 28, a feed pump 27 and a pipe 28 the upstream end of which is inside the tank 7 in a part suitable for drawing heavy fuel oil. The pump 27 can deliver a volume of heavy fuel oil greater than the maximum fuel requirement of the engine.

The region in which the heavy fuel is drawn from the tank 7 is provided with auxiliary heating means suitable for initiating the circulation of the fuel oil by suitably reducing its viscosity. In the example shown, these heating means consists of an electric heating coil 31 connected to a current source 32.

Finally, the pipe 25 which connects the second heat exchanger 18 with the three-way cock 22 has a discharge valve 34 the outlet from which is connected to a pipe 35 which also opens into the region of the heavy fuel oil tank 7 from which the fuel is drawn.

The functioning of this arrangement is as follows:

Assuming that the engine is stopped, it will have been supplied just before stopping, in a quite usual manner, with lighter diesel oil; since it will be quite evident that the engine could not start with the fuel system containing only heavy oil.

To start the engine, consequently, it is first run on diesel oil, the three-way cock 22 being set as shown by the broken lines in the drawing. The auxiliary heater 31 for the heavy oil is switched on in the corresponding section of the tank 7. When the viscosity of the heavy oil has fallen sufficiently, the fuel feed pump 27 can be started, and the cock 22 changed from the position shown in broken lines to the setting shown in full lines. The engine is now running on heavy fuel oil. The temperature in the second heat exchanger 18 is sufficient to reduce the viscosity of the heavy fuel oil to an acceptable value in order that the fuel may flow freely to the engine injection pump 3. Further, the excess fuel oil not taken by the engine is returned through the discharge valve 34 to the pipe 35 and provides an appreciable amount of additional heat to the heating device 31. Normally, the fuel pipe 35 will be too long to enable the fuel returned through this pipe to reach the suction zone of the fuel tank 7 at a sufficiently high temperature to be able to dispense with the auxiliary heating means 31. However, if the capacity of the pump 27 is sufficiently large, the surplus heavy oil returned through the discharge valve 34 and the pipe 35 to the tank 7 will be sufficient to supply enough heat to allow stopping of the auxiliary heating system 31. It may also prove advantageous to make use of the comparatively hot water from the engine cooling circuit to preheat the fuel tank directly, as well as some parts of the fuel feed piping, as has already been mentioned.

It may in fact be found advantageous to maintain the temperature of the cooling water at a value (e.g., 115° C.) appreciably higher than is usual, since the injection pump 3 and the pipes leading therefrom to the fuel injection valves 2 are already, by direct contact with the engine, at a sufficiently high temperature for the fuel to reach the injection valves 2 with a sufficiently low viscosity to allow suitable atomization of the fuel.

This invention is of course not restricted to the form of embodiment herein described and represented which is purely exemplary, but numerous modifications are possible, according to the intended purpose, without thereby departing from the scope of the invention.

I claim:

1. In a system for feeding preheated fuel to the fuel injection pump of an internal combustion engine having a cooling water jacket, said system including a fuel reservoir, a fuel delivery pump connected to said reservoir for drawing fuel therefrom and for delivering such fuel to said injection pump, a heat exchanger interposed between said fuel delivery pump and said injection pump, and a closed cooling circuit means including said cooling water jacket, a circulation pump and a water supply, the improvement for preventing vaporization of said water which comprises a fluid pressure means connected to said closed cooling circuit, said fluid pressure means exerting on said water supply, a substantially constant pressure of sufficient magnitude to prevent the formation of steam within said closed circuit.

2. The improvement defined in claim 1 wherein said heat exchanger is connected in said closed cooling circuit whereby said water in said circuit flows through said heat exchanger for preheating the fuel which also flows through said heat exchanger.

3. The improvement defined in claim 1 further including heating means adjacent the outlet of said fuel reservoir to preheat the fuel discharging therefrom.

4. The improvement defined in claim 1 wherein the delivery rate of said fuel delivery pump exceeds the fuel requirements of said internal combustion engine and wherein said system includes discharge valve means between said heat exchanger and said injection pump for discharging any excess preheated fuel transmitted from said fuel delivery pump and conduit means for returning said excess preheated fuel to said reservoir.

References Cited
UNITED STATES PATENTS

| | | | |
|---|---|---|---|
| 1,384,512 | 7/1921 | Buchi | 123—30.1 |
| 1,824,528 | 9/1931 | Bailey | 123—41.2 |
| 2,681,694 | 6/1954 | Loft | 158—36.3 |
| 2,865,345 | 12/1958 | Hilton | 123—30.1 |
| 2,940,435 | 6/1960 | Nemec et al. | 123—30.1 |

OTHER REFERENCES

Vapor-Phase Cooling by J. H. Wallace and R. A. Newton, Pacific Enterprise, 2833 E. 11th St., Los Angeles, Calif., August 1940.

LAURENCE M. GOODRIDGE, *Primary Examiner.*